(12) United States Patent
Liu

(10) Patent No.: US 8,274,257 B2
(45) Date of Patent: Sep. 25, 2012

(54) PORTABLE CHARGING EQUIPMENT

(76) Inventor: Yun-Zhao Liu, Guangdong Province (CN)

( * ) Notice: Subject to any disclaimer, the term of this patent is extended or adjusted under 35 U.S.C. 154(b) by 466 days.

(21) Appl. No.: 12/650,903

(22) Filed: Dec. 31, 2009

(65) Prior Publication Data

US 2011/0156646 A1    Jun. 30, 2011

(51) Int. Cl.
*H02J 7/00* (2006.01)
(52) U.S. Cl. .......................... 320/113; 320/114
(58) Field of Classification Search .................. 320/103, 320/107, 110, 112, 113, 114, 115
See application file for complete search history.

(56) References Cited

U.S. PATENT DOCUMENTS

| | | | |
|---|---|---|---|
| 6,747,963 B1* | 6/2004 | Park et al. | 370/335 |
| 7,489,105 B2* | 2/2009 | Weinstein et al. | 320/114 |
| 7,701,171 B2* | 4/2010 | Defant et al. | 320/114 |
| 8,174,236 B2* | 5/2012 | Park et al. | 320/113 |
| 2003/0117104 A1* | 6/2003 | Liao | 320/107 |
| 2006/0097692 A1* | 5/2006 | Chen et al. | 320/107 |
| 2008/0150479 A1* | 6/2008 | Cho et al. | 320/113 |
| 2008/0185990 A1* | 8/2008 | Hsu | 320/103 |
| 2008/0278113 A1* | 11/2008 | Fan | 320/113 |

* cited by examiner

*Primary Examiner* — Ramy Ramadan
(74) *Attorney, Agent, or Firm* — Rosenberg, Klein & Lee

(57) ABSTRACT

This invention relates to a portable charging equipment in which a socket is provided on side edge of a backup battery and a plug is correspondingly provided on a charger device. A recessed arc portion formed on the bottom surface of the charger device is to abut closely against the peripheral outer edge of the backup battery. A boost unit provided in the charger device is electrically connected to the plug, and a lead wire connected to the boost unit has an output terminal provided on the other end. A tightening strap body having hook and loop structure is attached to the charger device. The backup battery and the charger device can be inseparably affixed together by the fastening action of the tightening strap body.

3 Claims, 7 Drawing Sheets

PORTABLE CHARGING EQUIPMENT

BACKGROUND OF THE INVENTION

1. Field of the Invention

The present invention relates to a portable charging equipment, more particularly to a portable charging equipment which is to be carried conveniently by users, and whereby battery powered electronic product can be recharged with electricity directly to full power level in case of power emptied condition, so as to avoid inconvenience caused by unavailability of mains electricity for charging during the taking-out of the electronic product.

2. Brief Description of the Prior Art

Accompanying with the change of modern science and technology with each passing day, apparatuses offering greater convenience to the people have been emerging in an endless stream. Power sources available from surroundings can be utilized for driving common electronic products so as to reach anticipated effects easily. In view of the convenience contributed to human being, those electronic products have become not only popular but also almost indispensable items in our daily life. In order that the electronic products can be carried along with users for outside usage, rechargeable batteries are ordinarily provided on electronic products to offer economic and convenient benefits.

The above rechargeable battery can reach anticipated effect of recharge, however it is found in practical implementation that in some cases users fail to find socket of mains electricity for recharge purpose after the power of rechargeable battery is consumed. This may result in failure of reuse of battery powered electronic product. Therefore, there are still spaces for improvement in its total implementation.

In view of the above reasons, the inventor of the present invention provides a portable charging equipment according to the improvement conducted on disadvantages of the existing structure based on his abundant experience of R&D and manufacturing in relevant field so as to attain better value in practical application.

SUMMARY OF THE INVENTION

The portable charging equipment of this invention essentially has a socket provided on side edge of a backup battery and a plug correspondingly provided on a charger device. A recessed arc portion formed on the bottom surface of the charger device is abutted on the peripheral outer edge of the backup battery. A boost unit provided in the charger device is electrically connected to the plug, and a lead wire connected to the boost unit has an output terminal provided on the other end. A tightening strap body is attached to one side of the charger device, in which a bonding end is formed on one surface at front segment of the tightening strap body and an adjustable fixing end is correspondingly formed on the other surface at rear segment of the same. The backup battery and the charger device can be inseparably affixed together by the fastening action of the tightening strap body. In this manner, the portable charging equipment can be taken along easily with users and is very handy to supply power to charge an electronic product to full power level whenever its battery power is exhausted. It can increase more practical value in the integral embodiment and usage thereof.

BRIEF DESCRIPTION OF ACCOMPANYING DRAWINGS

DETAILED DESCRIPTION OF PREFERRED EMBODIMENT

The objects, the technical contents and the expected effectiveness of the present invention will become more apparent from the detailed description of the preferred embodiment in conjunction with the accompanying drawings.

Figure 1:
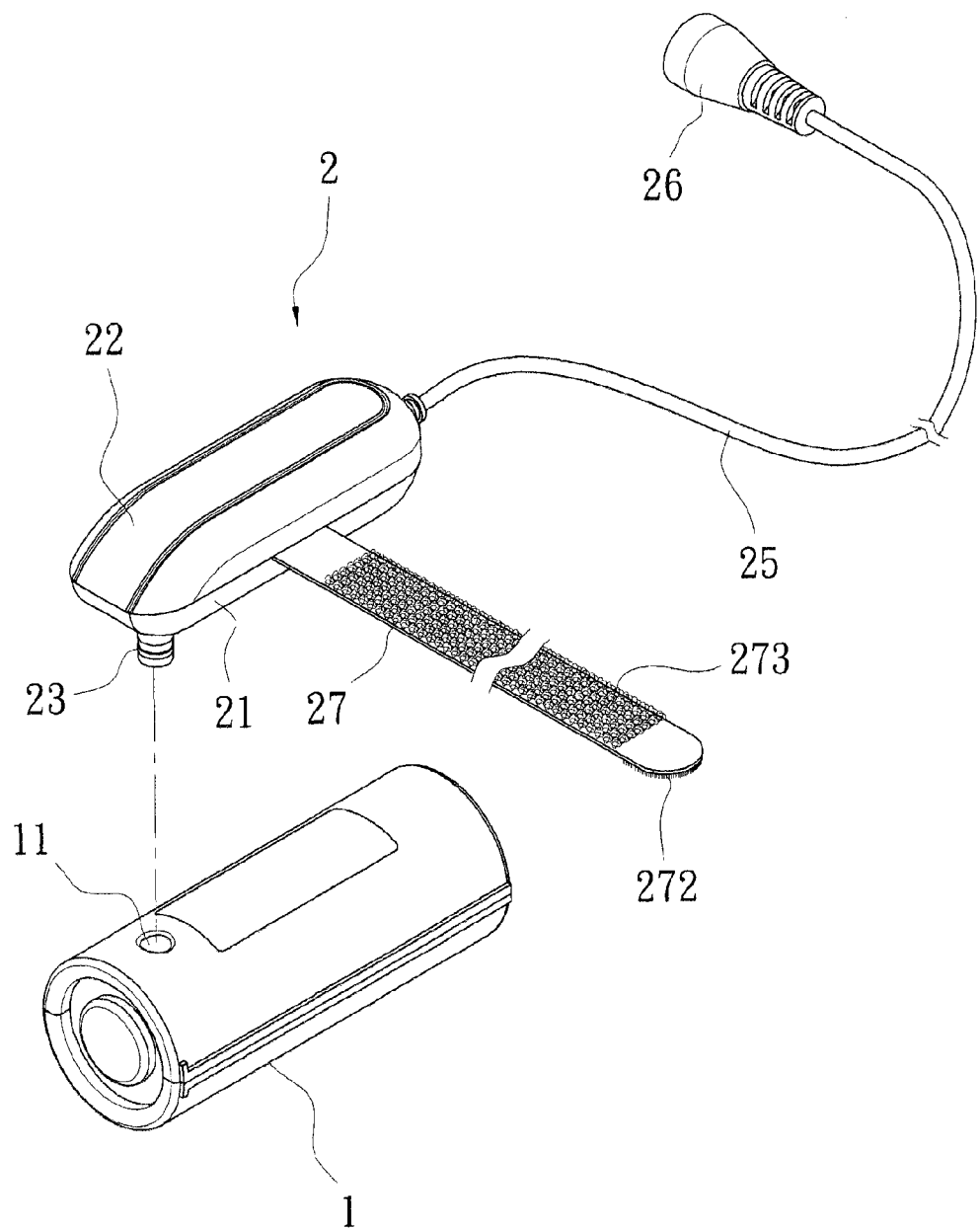
FIG. 1 is a perspective schematic view showing the structure of the portable charging equipment of the present invention.

FIG. 1 is a perspective schematic view showing the portable charging equipment of the present invention. As shown in the figure, the portable charging equipment of the present invention essentially comprises a rechargeable-dischargeable backup battery (1) and a charger device (2) cooperated with each other.

The backup battery (1) can operate as ordinary battery and can be recharged by mains electricity. A socket (11) is provided on the side edge of the backup battery (1).

Figure 2:
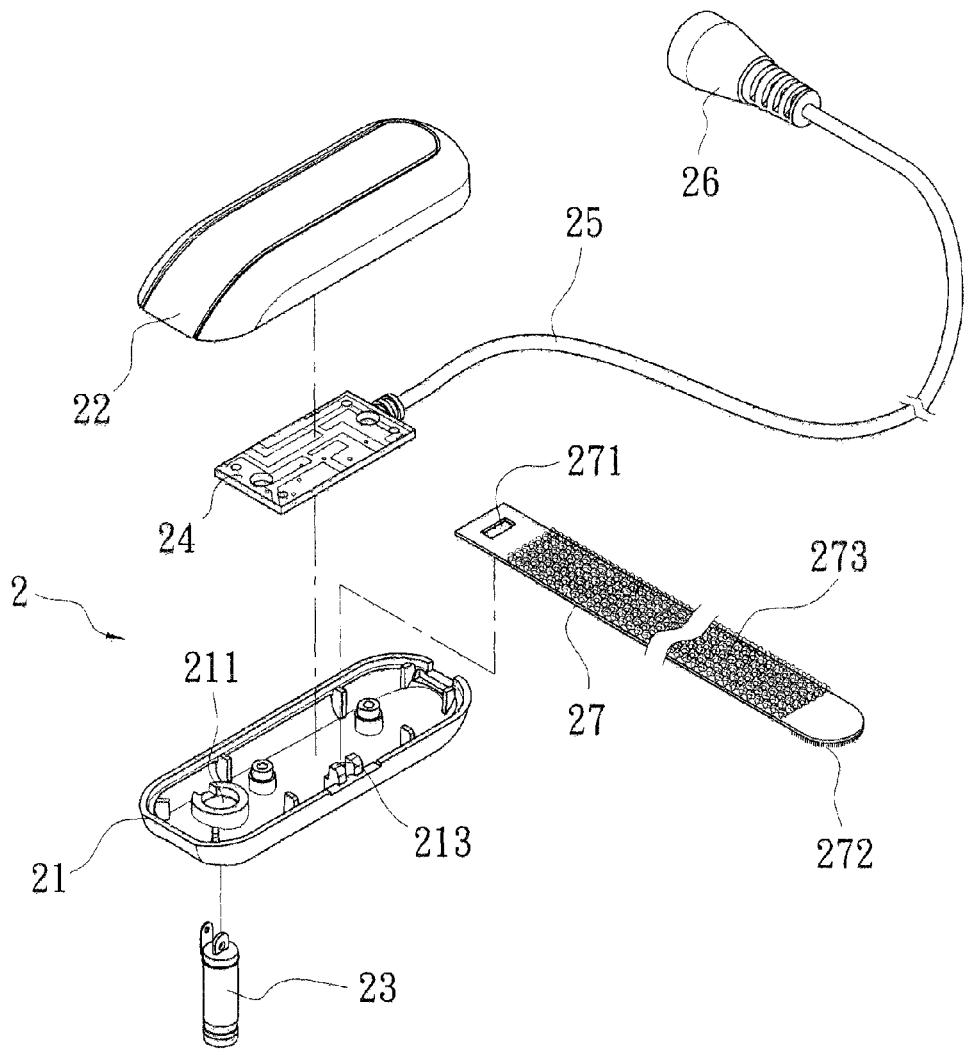
FIG. 2 is a perspective exploded view showing the structure of the portable charging equipment of the present invention.
Figure 3:
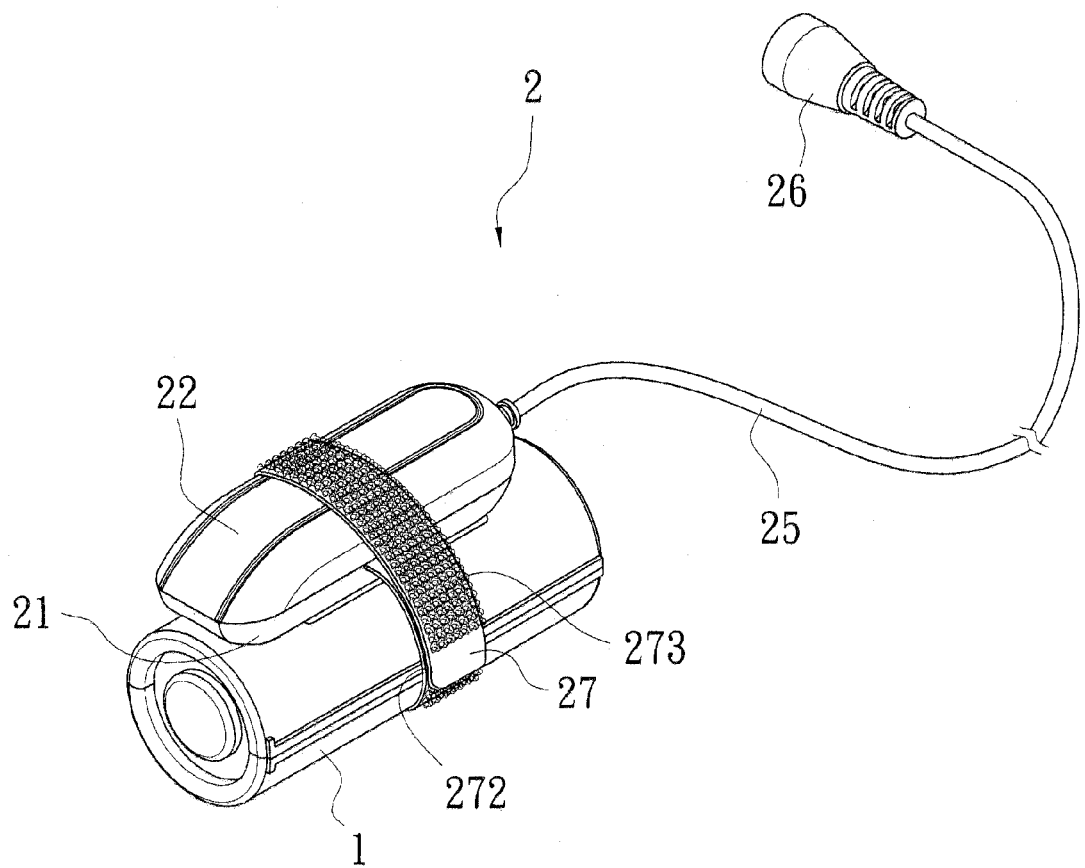
FIG. 3 is a perspective view showing the assembled state of the portable charging equipment of the present invention.
Figure 4:
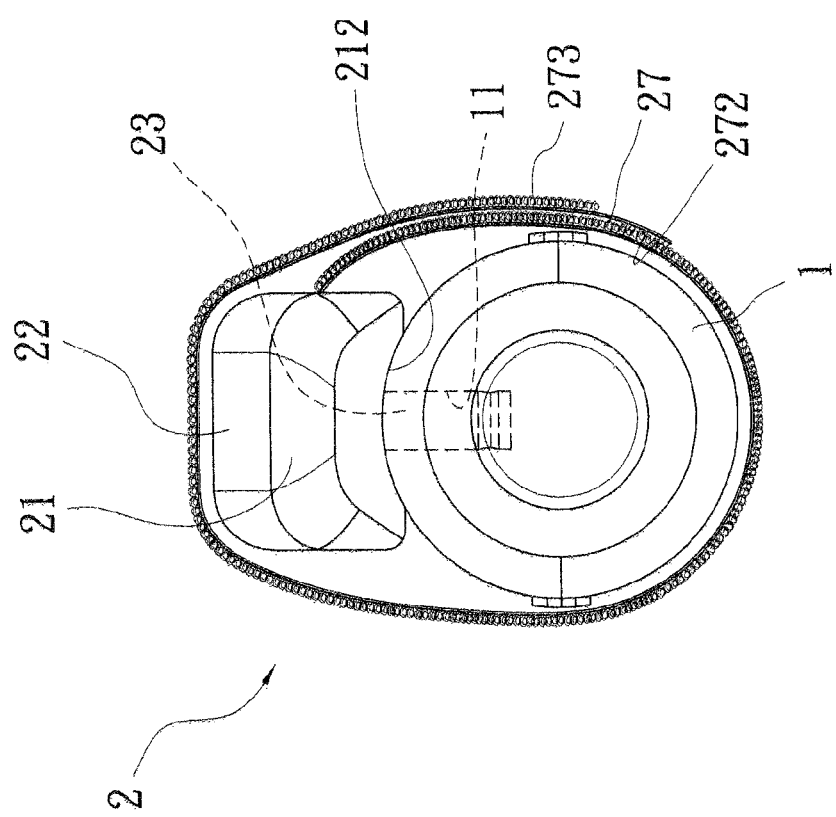
FIG. 4 is a front view showing the assembled state of the portable charging equipment of the present invention.
Figure 5:
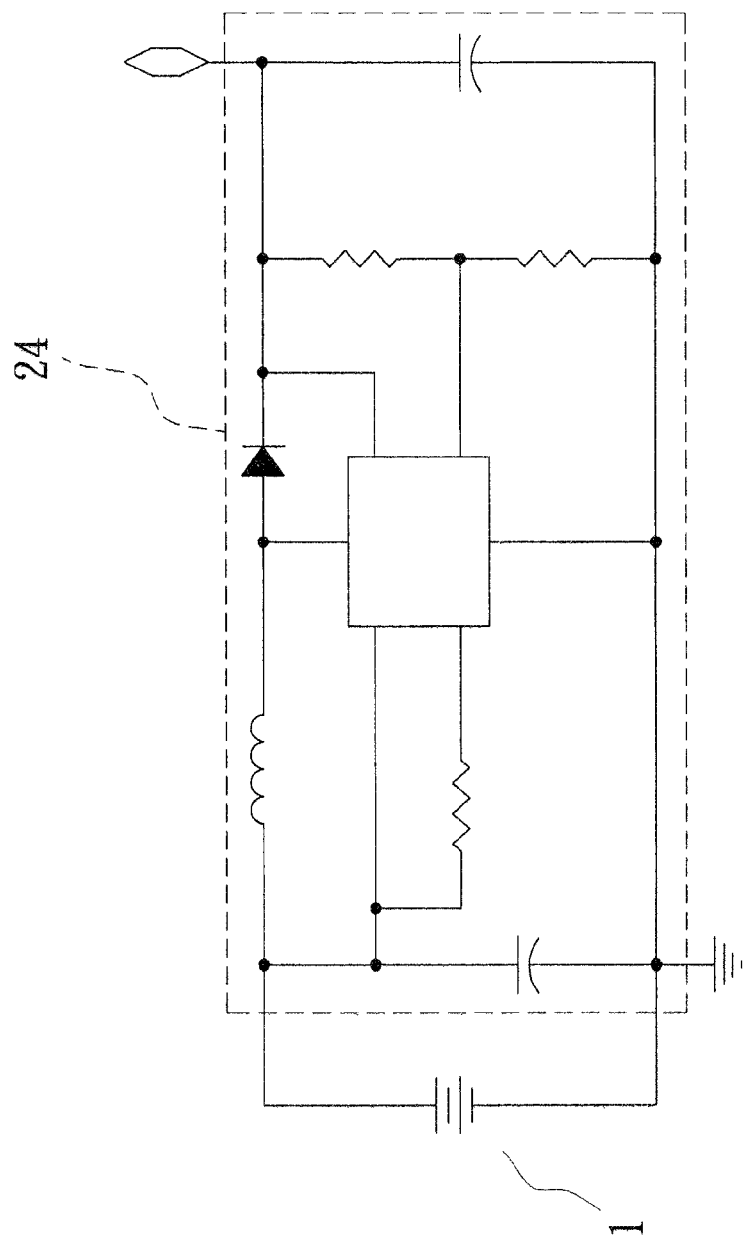
FIG. 5 is a schematic view showing the circuit of the boost unit of the present invention.

The charger device (2), as shown in FIG. 2, comprises a first housing (21) and a second housing (22) opposite to each other. The first housing (21) has a mounting aperture (211) for mounting a plug (23) therein, which is inserted into the socket (11) of the backup battery (1) when in operation. The bottom surface of the first housing (21) is provided with a recessed arc portion (212) matching with the peripheral outline of the backup battery (1) such that the first housing (21) can abut against the peripheral outer edge of the backup battery (1) closely, as shown in FIGS. 3 and 4. Referring to FIG. 5, a boost unit (24) connecting electrically to the plug (23) is provided in the first housing (21) and the second housing (22). A lead wire (25) is connected to the boost unit (24) and an output terminal (26) is connected to the other end of the lead wire (25). A holding portion (213) for holding the tightening strap body (27) between the first housing (21) and the second housing (22) is provided on one side of the first housing (21). A slot (271) for engagement with the holding portion (213) is opened at the front end of the tightening strap body (27). A bonding end (272) is formed on one surface at front segment of the tightening strap body (27) and an adjustable fixing end (273) is correspondingly formed on the other surface at rear segment of the tightening strap body (27).

With this configuration, when the portable charging equipment of the present invention is in operation, the plug (23) of the charger device (2) is inserted into the socket (11) of the backup battery (1), as shown in FIGS. 3 and 4. Meanwhile, the recessed arc portion (212) formed on the bottom surface of the first housing (21) of the charger device (2) is contacted in fully consistent manner on the peripheral outer edge of the backup battery (1), and the tightening strap body (27) attached to one side of the first and the second housings (21), (22) is wrapped around the peripheral outer edges of the backup battery (1) and the first and the second housings (21), (22). Then, the bonding end (272) at the front segment of the tightening strap body (27) is stuck to the adjustable fixing end (273) on the other surface of the rear segment of the same such that the backup battery (1) and the first and the second housing (21), (22) of the charger device (2) are inseparably affixed together by the fastening action of the tightening strap body (27).

After the backup battery (1) has been charged by connection to mains electricity, the socket (11) of the backup battery (1) is coupled to the plug (23) of the charger device (2), meanwhile the output terminal (26) on the other end of the lead wire (25) of the charger device (2) is directly connected to the electronic product to be recharged. Then, the electricity stored in the backup battery (1) is boosted by the boost unit (24) within the charger device (2) so as to charge the electronic product to full power level.

Figure 6:
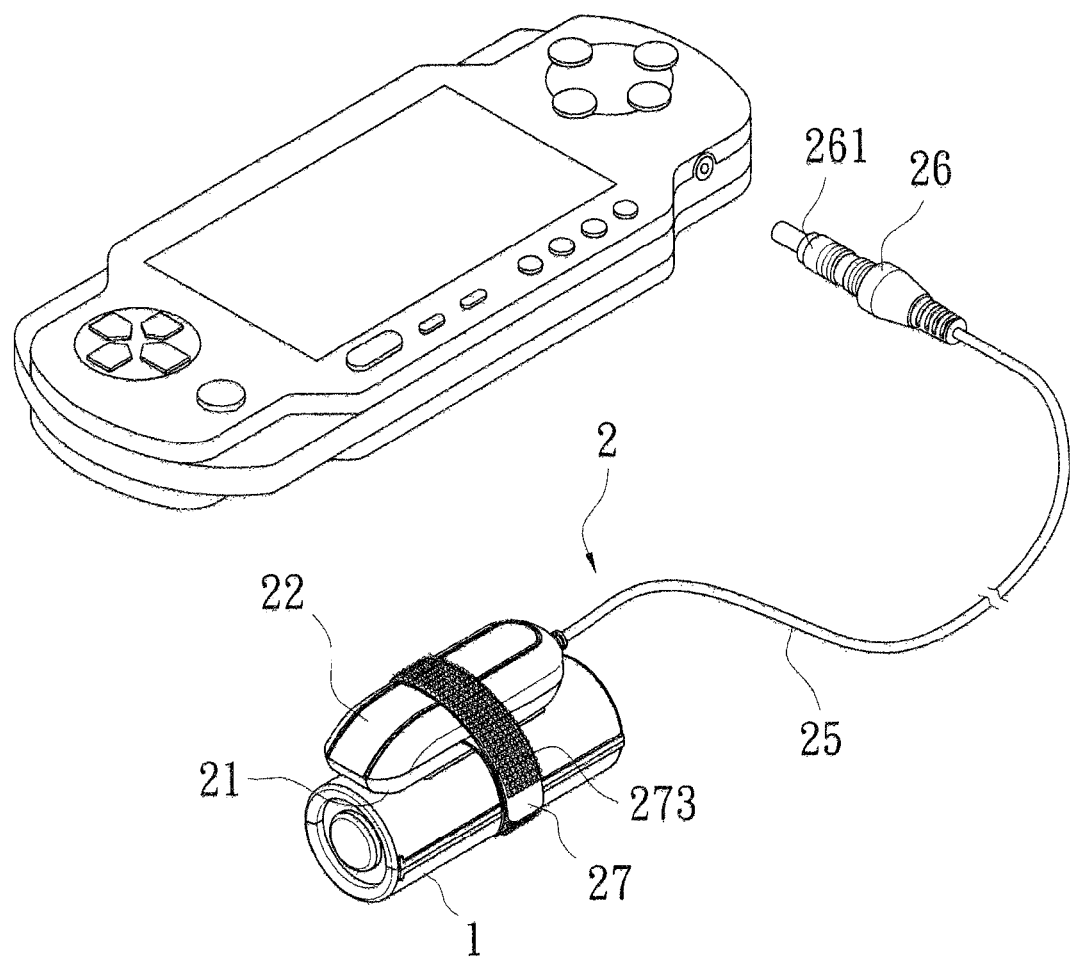
FIG. 6 is a schematic view showing the state of the first embodiment of the portable charging equipment of the present invention in operation.
Figure 7:
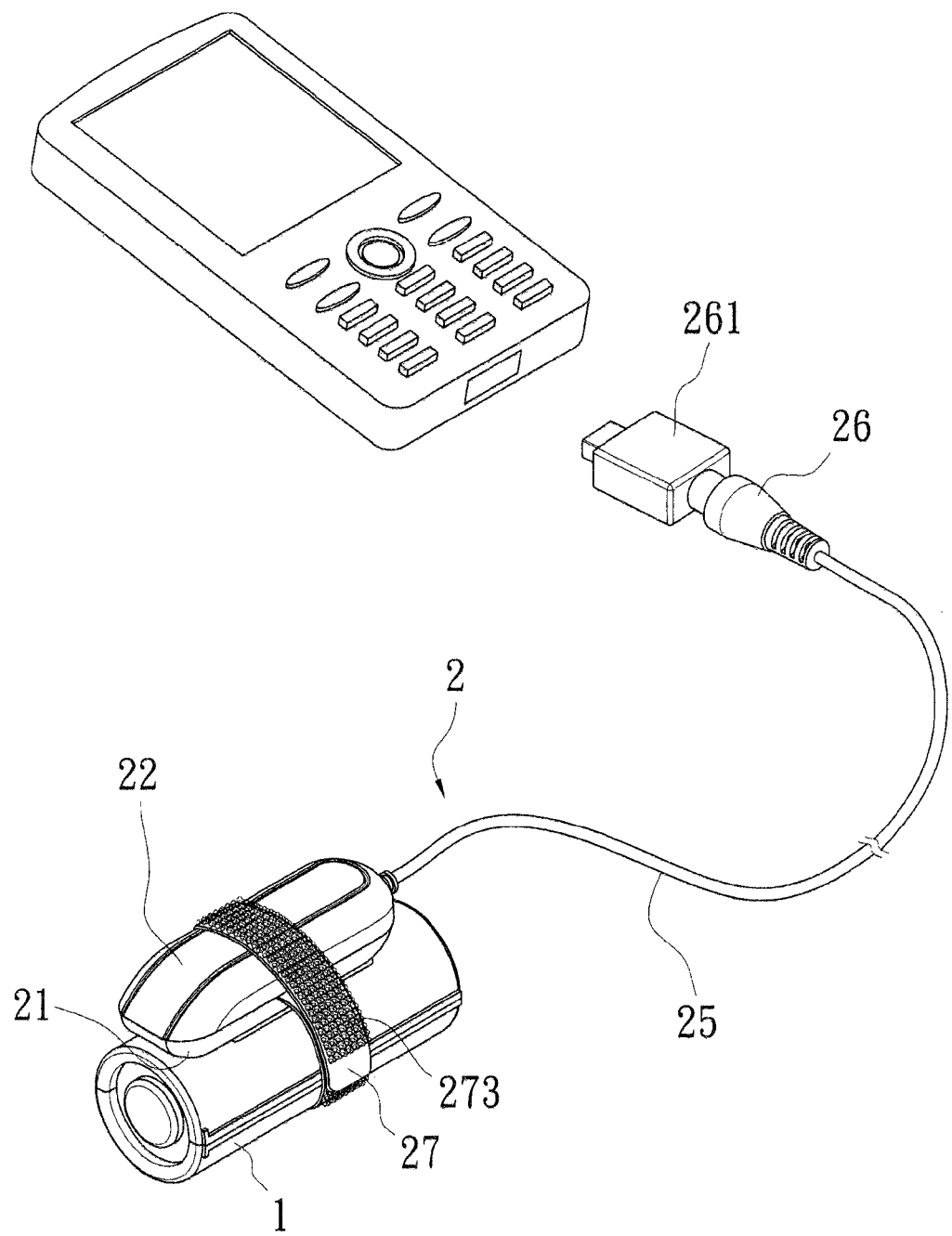
FIG. 7 is a schematic view showing the state of the second embodiment of the portable charging equipment of the present invention in operation.

Furthermore, referring to FIGS. 6 and 7 respectively showing the first and the second embodiments in using state, a through-connection terminal (261) can also be connected to the output terminal (26) on the other end of the lead wire (25) of the charger device (2) so as to match different specification of various electronic product, and the through-connection terminal (261) is then combined with the electronic product to be recharged so that the electricity stored in the backup battery (1) can be charged to the electronic product to full power level in the same manner as above.

The abovementioned embodiment and drawings are not intended to restrict the product structure or usage type of the present invention. Appropriate variations and modifications made by the person having ordinary knowledge in the art without departing from the spirit and scope of the present invention are still considered to be within the scope of the present invention.

Based on the foregoing, the portable charging equipment of the present invention has the following advantages, when comparing with prior art.

1. In the present invention, a socket provided on a rechargeable-dischargeable backup battery can be coupled with a plug provided on a charger device which is then connected to electronic product directly or through a through-connection terminal. Then, the electricity stored in the backup battery is boosted by a boost unit within the charger device so as to charge the electronic product to full power level.

2. The portable charging equipment of the present invention is handy to be carried by users, and whereby battery powered electronic product can be directly recharged with electricity stored in the rechargeable-dischargeable backup battery to full power level in case of power-emptied condition, so as to avoid inconvenience caused by unavailability of mains electricity for charging.

What is claimed is:

1. A portable charging equipment, essentially comprising a rechargeable-dischargeable backup battery and a charger device, wherein:

said backup battery has a socket provided on side edge;

said charger device has a plug corresponding to said socket of the backup battery, a recessed arc portion matching with the peripheral outline of the backup battery being provided on the bottom surface of said charger device such that said charger device abuts closely against the peripheral outer edge of said backup battery, a boost unit connecting electrically to said plug being provided in said charger device, a lead wire being connected to said boost unit and an output terminal being connected to the other end of said lead wire, a tightening strap body being disposed on one side of said charger device, a bonding end being formed on one surface of the front segment of said tightening strap body and an adjustable fixing end being correspondingly formed on the other surface of the rear segment of said tightening strap body.

2. A portable charging equipment as claimed in claim 1, wherein said charger device has a first housing and a second housing opposite to each other, said first housing having a mounting aperture for mounting said plug therein, the bottom surface of said first housing being provided with a recessed arc portion, a boost unit being provided in said first housing and said second housing, a holding portion for holding the tightening strap body between said first housing and said second housing being provided on one side of said first housing, a slot for engagement with the holding portion being opened at the front end of said tightening strap body.

3. A portable charging equipment as claimed in claim 1, wherein a through-connection terminal can be connected to said output terminal of the charger device so as to meet different specification requirement of various electronic product.

\* \* \* \* \*